United States Patent [19]

Ranieri

[11] Patent Number: 6,079,109
[45] Date of Patent: Jun. 27, 2000

[54] METAL-CUTTING SAW BOW FRAME INCLUDING A DEVICE FOR TENSIONING OF THE BLADE

[75] Inventor: Eric Ranieri, Besançon, France

[73] Assignee: Sicfo Stanley S.A., Besancon, France

[21] Appl. No.: 09/068,396

[22] PCT Filed: Sep. 30, 1997

[86] PCT No.: PCT/FR97/01719

§ 371 Date: May 8, 1998

§ 102(e) Date: May 8, 1998

[87] PCT Pub. No.: WO98/15377

PCT Pub. Date: Apr. 16, 1998

[30] Foreign Application Priority Data

Oct. 10, 1996 [FR] France ................................. 96/12528

[51] Int. Cl.[7] .................................................. B27B 21/06
[52] U.S. Cl. ............................................................ 30/513
[58] Field of Search ...................................... 30/513, 507

[56] References Cited

U.S. PATENT DOCUMENTS

| | | | |
|---|---|---|---|
| 925,112 | 6/1909 | Leland | 30/513 |
| 1,066,659 | 7/1913 | Rodehaver | 30/513 |
| 1,115,858 | 11/1914 | Nielsen | 30/513 |
| 1,722,316 | 7/1929 | Saffold | 30/513 X |
| 2,194,494 | 3/1940 | Carroll | 30/513 X |
| 2,320,511 | 6/1943 | Curry | 30/513 X |
| 2,546,660 | 3/1951 | Wilcox | 30/506 |
| 3,002,542 | 10/1961 | Dreier | 30/513 |
| 3,327,748 | 6/1967 | Reuterfors | 30/508 |
| 3,636,997 | 1/1972 | Keymer | 30/513 |
| 3,822,731 | 7/1974 | Keymer | 30/513 |
| 4,349,059 | 9/1982 | Hepworth et al. | 30/513 |
| 4,367,779 | 1/1983 | Ewig | 30/506 |
| 4,466,471 | 8/1984 | Thomson | 30/517 |
| 4,680,863 | 7/1987 | Duffy | 30/507 X |
| 5,471,752 | 12/1995 | Koetsch | 30/513 |
| 5,553,385 | 9/1996 | Crozier | 30/507 X |
| 5,673,488 | 10/1997 | Grayo | 30/513 |

FOREIGN PATENT DOCUMENTS

| | | | |
|---|---|---|---|
| 580258 | 11/1924 | France . | |
| 2344365 | 10/1977 | France | 30/513 |
| 2624780 | 6/1989 | France . | |
| 2663574 | 12/1991 | France . | |
| 189070 | 12/1922 | United Kingdom . | |

*Primary Examiner*—Maurina Rachoba
*Assistant Examiner*—Charles Goodman
*Attorney, Agent, or Firm*—Gary M. Cohen

[57] ABSTRACT

The frame of a metal-cutting saw of the one-piece, hacksaw type includes a bow (6) extended at its rear end by a pistol grip (3) and a protective branch (7) and at its front end by a branch (9) which at its end includes an attachment stud (14) for receiving one of the two ends of a blade (2). The pistol grip (3) has a blade-tensioning device comprised of a blade-tension adjustment system (4) including a lever fixed by an articulation pin (18) to an articulation stirrup piece (8) which extends into the rear part of the protective branch (7). The articulation pin (18) constitutes an axis about which the lever (5) can rotate. The blade-tension adjustment system (4) further includes a blade support (12) which receives the other end of the blade (2) and an opening (12a) for allowing the articulation pin (18) to pass through. A threaded rod (15) is connected to the blade support (12), and provides for articulation of the lever (5) about an articulation pin (17). The articulation pin (17) has a smooth hole for receiving the threaded rod (15), and receives an adjustable thumbwheel (16) which bears against the articulation pin (17).

15 Claims, 2 Drawing Sheets

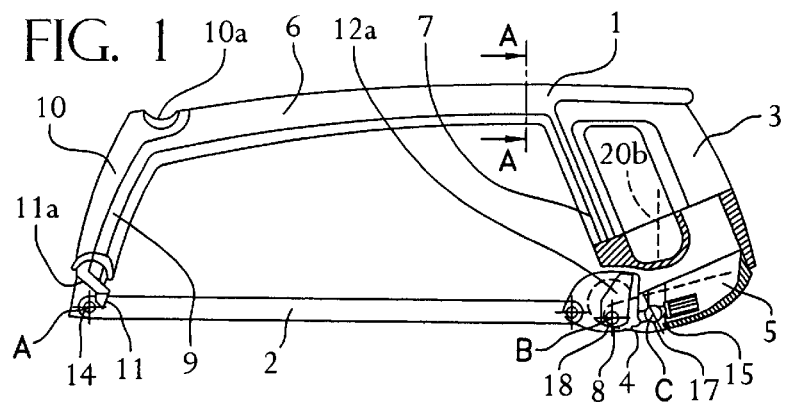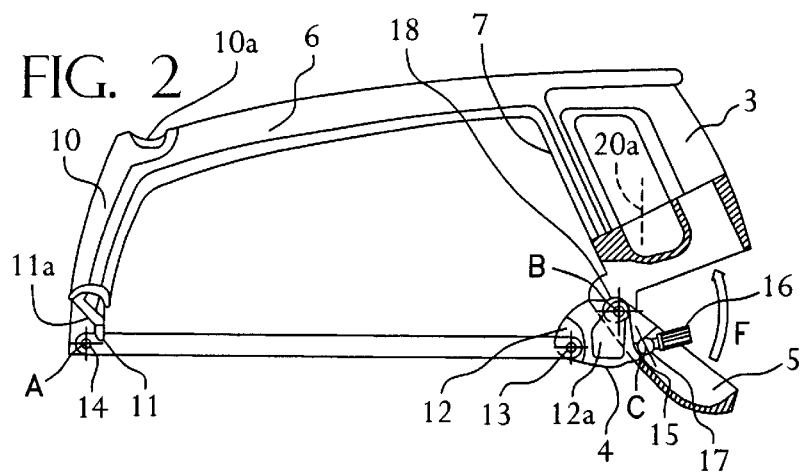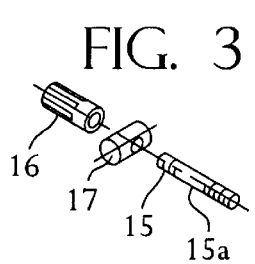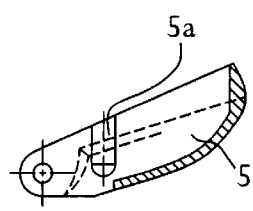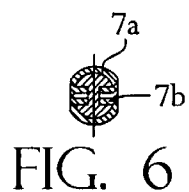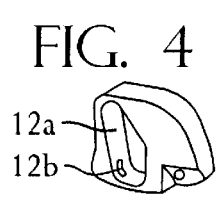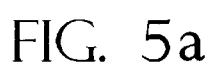

6,079,109

METAL-CUTTING SAW BOW FRAME INCLUDING A DEVICE FOR TENSIONING OF THE BLADE

BACKGROUND OF THE INVENTION

The present invention generally relates to a frame for a metal-cutting saw of the one-piece hacksaw type including a bow extended at its rear end by a pistol grip. The pistol grip includes a hand-protection branch which meets the grip at the lower part, and which incorporates a blade-tensioning mechanism.

The user of a metal-cutting saw needs to change the blade of his tool either regularly, because the blade is becoming worn, or to change the type of blade depending on the specific type of cutting being done. All of these blade changes tend to make the blade tensioning increasingly less precise.

Metal-cutting saws having adjustable blade-tensioning devices have previously been proposed in order to solve this problem. For example, French Patent Application No. 2,624, 780 discloses a device having a profiled lever with a cam shape which is capable of pushing up against and then tilting against the opposing face of the blade-holder arm. The lever is associated, via its lower part, with the outer end of a tension-retaining member, or fitting. The fitting allows the tension to be adjusted by altering the position of a nut provided on the fitting.

The disclosed device, which is relatively quick to operate, does not allow the blade to be adjusted very accurately because the position of the nut provided for achieving such adjustment can vary only by whole numbers of turns.

U.S. Pat. Nos. 4,367,779 and 4,466,471 also disclose metal-cutting saws with mechanisms for adjusting the tension of the blade using a lever in the hand grip of the saw which pivots to create tension in the blade through a rod which acts on a lever arm. In each case, the tension is adjusted by varying the length of the rod.

Although generally satisfactory, such devices are on the one hand complicated to operate, while on the other hand, because of their significant number of component parts, such devices are not very robust from a mechanical point of view.

Accordingly, it is an object of the present invention to overcome the drawbacks of these prior devices while allowing the user to preset the tension in the saw blade.

Another object of the present invention is to allow the blade to be fitted quickly, by limiting the number of operations to be carried out on the frame.

SUMMARY OF THE INVENTION

In accordance with the present invention, these and other objects are achieved by providing the frame of a metal-cutting saw of the one-piece hacksaw type with a bow which is extended at its rear end by a pistol grip having a protective branch, and which is extended at its front end by a branch which, at its end, includes an attachment stud for receiving one of the two ends of a blade. The attachment stud includes a blade-tensioning device which comprises a blade-tension adjustment system having a lever fixed by an articulation pin to an articulation stirrup piece which extends into the rear part of the protective branch. The articulation pin constitutes an axis about which the lever can rotate. The blade-tension adjustment system comprises a blade support which receives the other end of the blade and which includes an opening allowing the articulation pin to pass through, and a threaded rod which is on the one hand permanently connected to the blade support and which is on the other hand articulated to the lever by an articulation pin. The articulation pin is provided with a smooth hole through which the threaded rod can pass. A thumbwheel is screwed onto the thumbwheel, and bears against the pierced articulation pin.

The saw frame preferably includes, in combination, a hand grip, a rear branch of the bow and a stirrup piece for articulating the lever. A lower part of the grip has a shape which mates with the lever and protects the tension-adjustment members, and mates with the bow, which has a changing cross-section that curves toward the blade. Also provided is an ergonomically designed region on which the operator's thumb can rest and which is positioned on the upper branch of the bow, a region against which the blade can rest and a stub that holds the blade at the lower end of the front branch of the bow.

The present invention will be better understood with reference to the description which is provided below, together the following drawings.

BRIEF DESCRIPTION OF THE DRAWINGS

FIG. 1 is a side view of the saw frame of the present invention, with the blade-tensioning system in the closed position and with the lower part of the hand grip incorporating the adjustment system being cut away to show internal structures.

FIG. 2 is a view similar to FIG. 1, but with the blade-tensioning system in the open position.

FIG. 3 is an exploded view of the adjustment members.

FIG. 4 is a perspective view of the blade support.

FIG. 5a is a top view of the blade-tensioning lever.

FIG. 5b is a cross-sectional view, taken along the line BB, of the lever of FIG. 5a.

FIG. 6 is a cross-sectional view, taken along the line AA, of the bow of FIG. 1.

DETAILED DESCRIPTION OF A PREFERRED EMBODIMENT

Figure 7A:
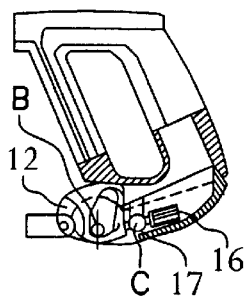
FIGS. 7a and 7b are side views of the blade-tension adjustment system for achieving different blade tension settings.

FIGS. 1 to 11 show the frame of a metal-cutting saw (1) which, in the embodiment shown, is of the hacksaw type. The saw (1) comprises a bow (6) extended at its rear end by a pistol grip (3) and a protective branch (7) for protecting the user's hand. The lower part of the pistol grip (3) incorporates a tension-adjustment system (4).

The blade (2) is fixed at both of its ends. One end is fixed to the end of a branch (9) which has an attachment stud (14). The other end is fixed to a blade support (12) which includes an attachment stud (13). The blade support (12) constitutes one of the elements of the tension-adjustment system (4).

A lower extension of the protective branch (7) has an articulation stirrup piece (8) which includes a hole for receiving an articulation pin (18). The articulation pin (18) receives a lever (5), and constitutes a pin about which the lever (5) can rotate. The lower part of the pistol grip (3), which is situated between the rear of the articulation stirrup piece and the lever (5), has a shape that mates with the adjustment system for receiving the blade-tension adjustment system when the lever (5) is in its closed and self-locking position.

Figure 7B:
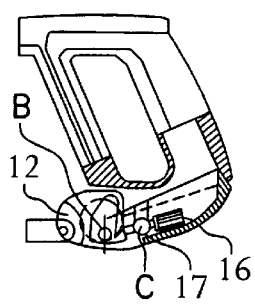

The blade support (12) has an opening (12a). The articulation pin (18) passes through the opening (12a) for movement in a direction more or less perpendicular to the longitudinal axis of the blade. The opening (12a) may be oblong, and preferably has more or less the shape of a right-angled trapezium with rounded corners. The lever (5) can pivot about the articulation pin between a closed position (as shown in FIGS. 1, 7a and 7b) and an open position (as shown in FIG. 2).

A hole (12b) is provided in the wall of the blade support (12) so that one of the ends of a threaded rod (15) can be screwed into the blade support. The threaded rod (15) also passes, with clearance, through a smooth hole drilled in an articulation pin (17). A thumbwheel (16) is screwed onto the other end of the threaded rod (15) so as to control the travel of the articulation pin (17). In its preferred embodiment, the threaded rod (15) has a smooth section (15a) to better allow the pierced articulation pin (17) to slide.

A slot (5a) is provided in the lever (5) to receive the articulation pin (17) for secured articulation relative to the threaded rod (15), and indirectly, to the blade support (12), making it possible for the articulation pin (17) to slide in the slot (5a).

Collectively, the blade support (12), the threaded rod (15), the pierced articulation pin (17) and the thumbwheel (16) make up the blade-tension adjustment system.

Figure 8:
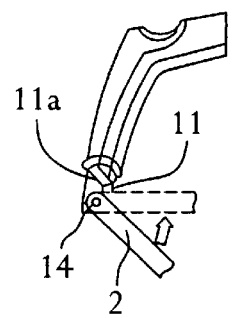
FIG. 8 is a side view of the front part of the bow during positioning of the blade.
Figure 9:
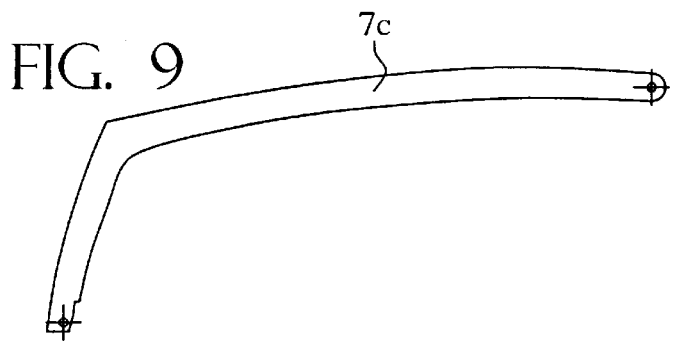
FIG. 9 is a side view of the metal strip associated with the bow.
Figure 10:
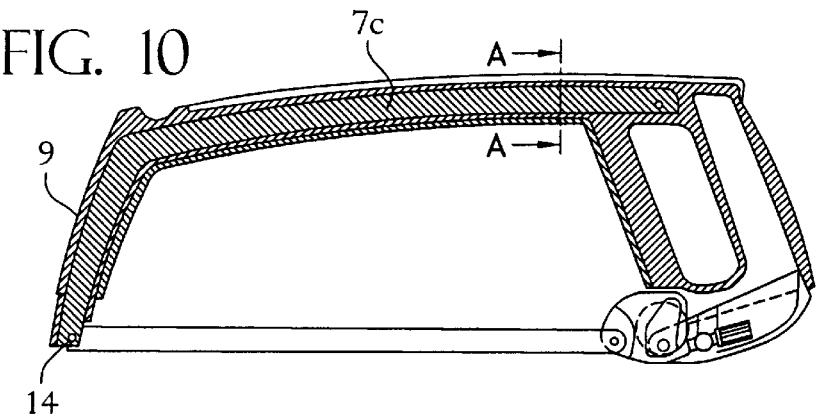
FIG. 10 is a side view, in longitudinal cross-section, of the saw frame of the present invention, illustrating the position of the metal strip shown in FIG. 9.
Figure 11:
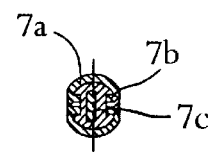
FIG. 11 is a cross-sectional view, taken along the line AA, of the bow shown in FIG. 10.

Advantageously, the end of the branch (9) has a retaining stub (11) with an inclined side (11a) facing toward the outside of the bow, above the attachment stud (14). As illustrated in FIG. 8, the blade (2) is positioned parallel to the inclined side (11a) of the stub (11) so that one of its ends can be fitted over the attachment stud (14). The blade is pivoted counter-clockwise so that its other end can be slipped over the attachment stud (13) of the blade support.

When the lever (5) is in the open position, the blade support is given a certain amount of latitude for movement in the mid-plane of the frame. The tension is adjusted by turning the thumbwheel (16) on the threaded rod (15). In this way, the thumbwheel (16) is caused to bear on and react against the pierced articulation pin (17).

The blade is tensioned by the force exerted by the user on the lever (5) so as to bring the lever (5) back into the closed position, passing through a point of equilibrium in which the points A, B and C, the respective centers of the attachment stud (14), the attachment pin (18) and the articulation pin (17), are aligned. The lever (5) is then in a self-locking position, with the point C being above a straight line that passes through the points A and B.

The difference in distances (20a)–(20b) corresponding to the travel of the point C generates tension in the blade (2) by 'elastic' deformation of the bow (6). To withstand these deformation forces, the bow has an I-shaped cross-section (7a). Preferably, this I-shaped cross-section is locally ribbed in a horizontal section (7b) passing through the horizontal mid-plane of the I-shaped cross-section, as illustrated in FIG. 6. This section changes and is curved toward the blade. To further improve the resistance to these deformation forces, a metal strip (7c) having a rectangular cross-section (e.g., having an I-shaped cross-section) is inserted inside the bow. The strip (7c) extends more or less as far as the end of the branch (9) where the attachment stud (14) is situated. In this way, the L-shaped metal insert operates to ensure that the bow will be rigid and that the attachment stud or stub is held at its front end.

For optimum comfort in use, the front face of the branch (9) has an ergonomic resting region (10), and the upper branch of the bow has a region (10a) for positioning the user's thumb.

What is claimed is:

1. A frame for a metal-cutting saw comprising:

a bow, wherein the bow is extended at a rear end by a pistol grip and a protective branch, and wherein the bow is extended at a front end by a branch having an end which includes an attachment stud for receiving a first end of a blade; and a blade-tensioning device having a blade-tension adjustment assembly, wherein the blade-tensioning device includes a lever fixed by a first articulation pin to an articulation stirrup piece which extends into a rear part of the protective branch, wherein the first articulation pin defines an axis about which the lever can rotate, and wherein the blade-tension adjustment assembly includes a blade support for receiving a second end of the blade, an opening for receiving the first articulation pin therein, a threaded rod connected to the blade support and connected for articulation relative to the lever by a second articulation pin which includes a hole for receiving the threaded rod, and a thumbwheel threadingly engaging the threaded rod and bearing against the second articulation pin.

2. The frame of claim 1 wherein the metal-cutting saw is a one-piece hacksaw.

3. The frame of claim 1 wherein a lower part of the pistol grip is located between the rear of the articulation stirrup piece and the lever.

4. The frame of claim 3 wherein the lower part of the pistol grip has a shape that mates with the blade-tension adjustment assembly, for receiving the blade-tension adjustment assembly when the lever is in a closed and self-locking position.

5. The frame of claim 1 wherein the opening has a shape which approximates a trapezium with rounded corners.

6. The frame of claim 1 wherein the first articulation pin slidingly passes through the opening, for movement in a direction which is substantially perpendicular to a longitudinal axis defined by the blade.

7. The frame of claim 1 wherein the lever includes a slot for receiving the second articulation pin, for securing the second articulation pin to the threaded rod for articulation relative to the threaded rod.

8. The frame of claim 1 wherein the threaded rod has a smooth section for freely and slidingly receiving the second articulation pin.

9. The frame of claim 1 wherein the end of the branch has a retaining stub located above the attachment stud.

10. The frame of claim 9 wherein the retaining stub has an inclined side facing toward outside portions of the bow.

11. The frame of claim 1 which further includes a metal strip located inside the bow, wherein the metal strip extends approximately to the end of the branch, to a position substantially adjacent to the attachment stud.

12. The frame of claim 11 wherein the metal strip has a substantially rectangular cross-section.

13. The frame of claim 1 wherein the bow has a substantially I-shaped cross-section.

14. The frame of claim 13 wherein the I-shaped cross-section is locally ribbed in a horizontal section passing through a mid-plane of the I-shaped cross-section.

15. The frame of claim 13 wherein the I-shaped cross-section is variable and is curved toward the blade.

* * * * *